Dec. 21, 1965  F. J. CARSON ET AL  3,224,859
APPARATUS FOR BENDING GLASS SHEETS
WITH AN OUTRIGGER SUPPORT
Original Filed May 14, 1957  5 Sheets-Sheet 1
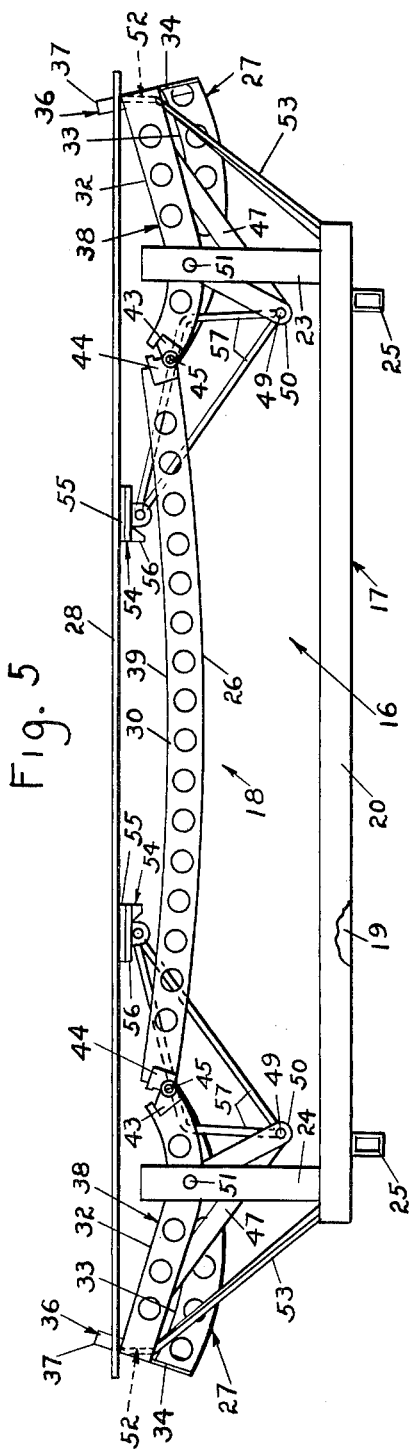
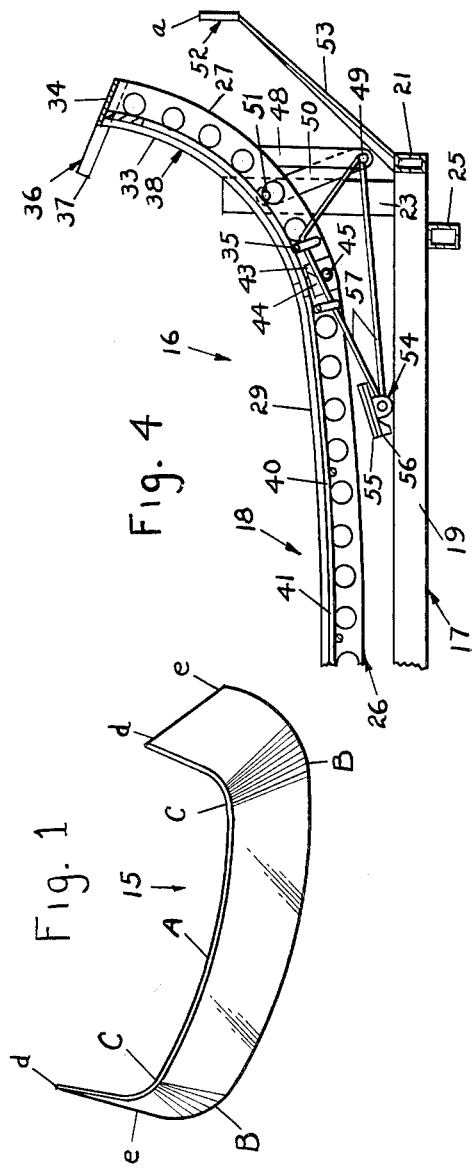
INVENTORS
Frank J. Carson and
BY Herbert A. Leflet, Jr.
Nobbe & Swope
ATTORNEYS

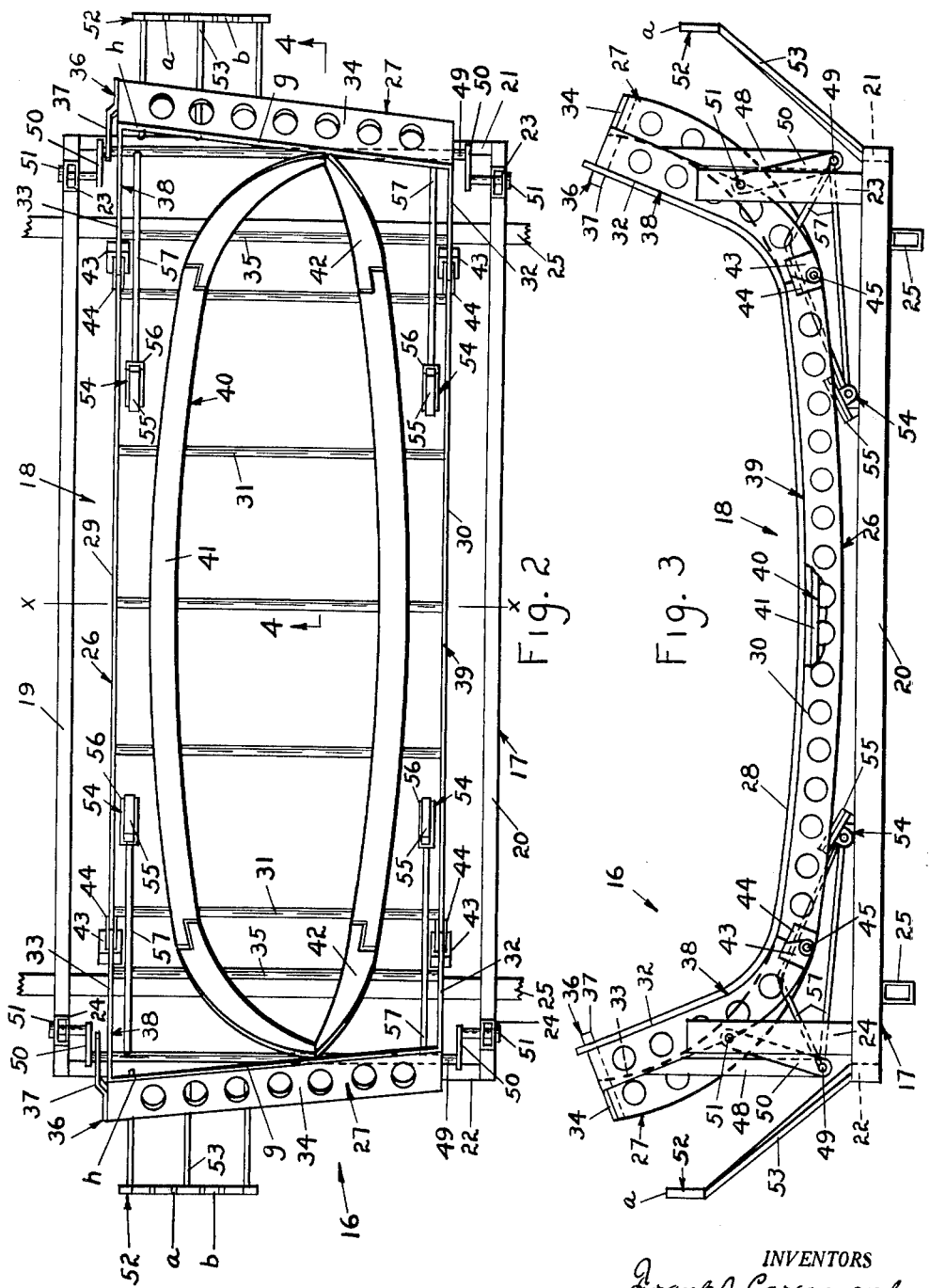

Dec. 21, 1965  F. J. CARSON ET AL  3,224,859
APPARATUS FOR BENDING GLASS SHEETS
WITH AN OUTRIGGER SUPPORT
Original Filed May 14, 1957  5 Sheets-Sheet 3
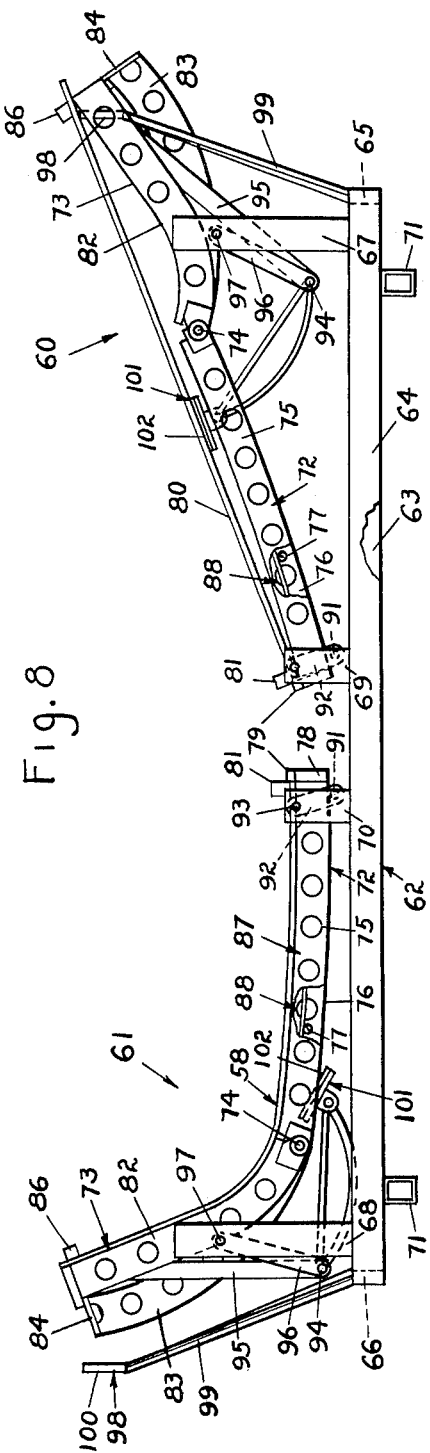
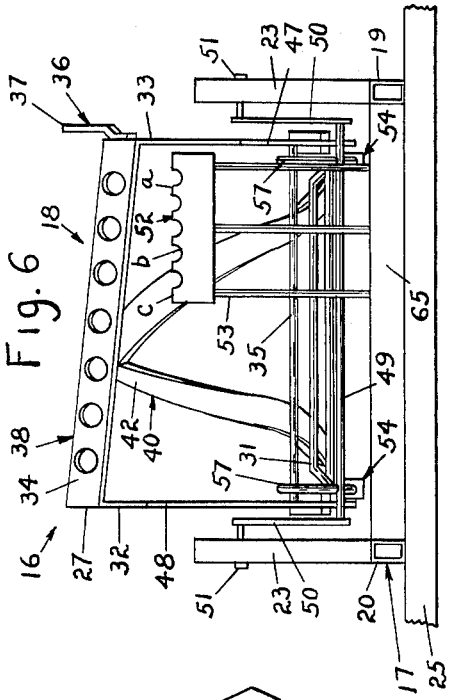
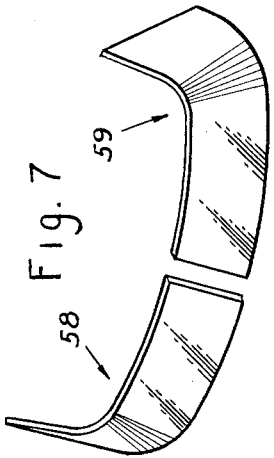
INVENTORS
Frank J. Carson and
BY Herbert A. Leflet, Jr.
Nobbe & Swope
ATTORNEYS

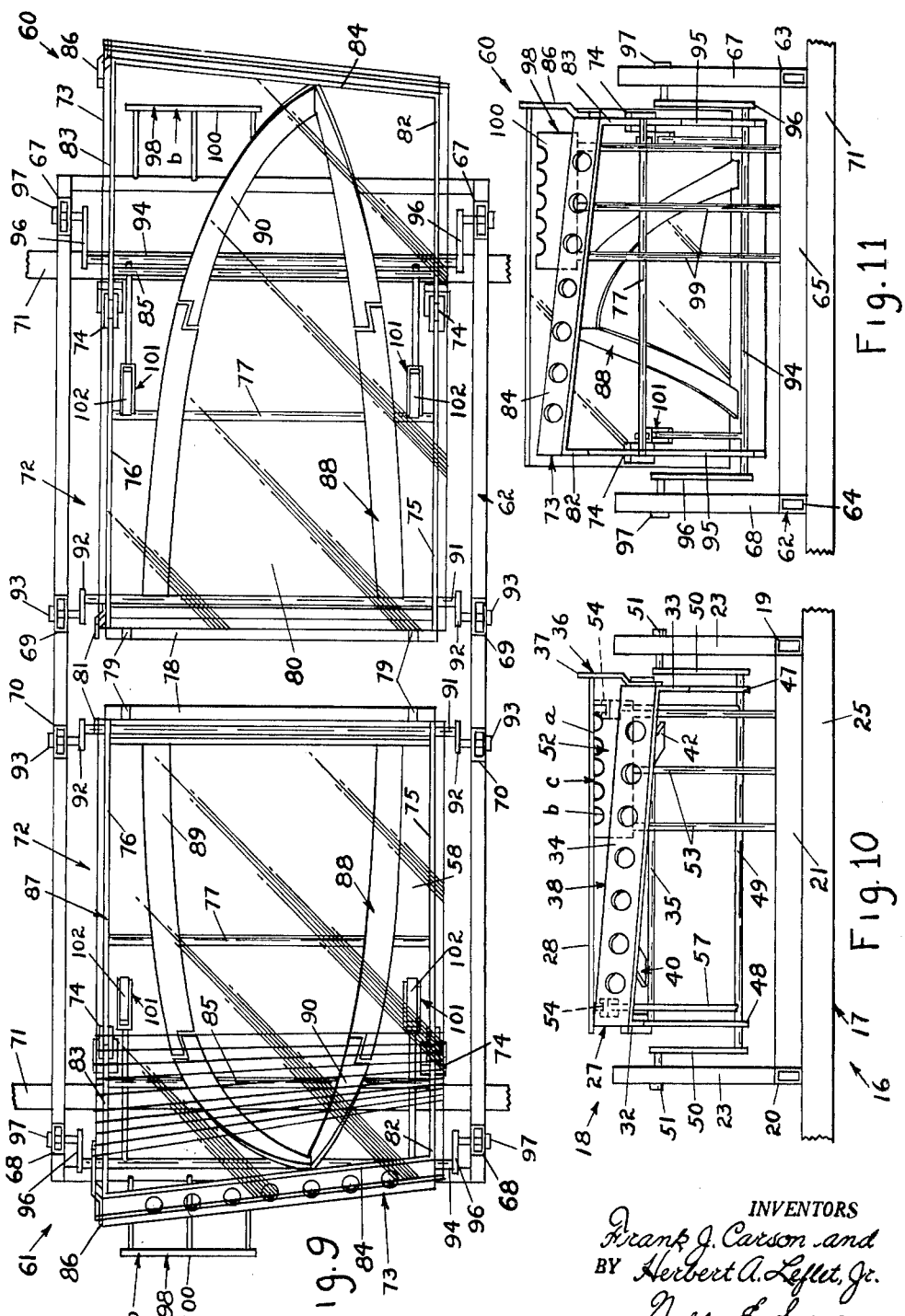

United States Patent Office 3,224,859
Patented Dec. 21, 1965

3,224,859
APPARATUS FOR BENDING GLASS SHEETS WITH AN OUTRIGGER SUPPORT
Frank J. Carson and Herbert A. Leflet, Jr., Toledo, Ohio, assignors to Libbey-Owens-Ford Glass Company, Toledo, Ohio, a corporation of Ohio
Continuation of application Ser. No. 795,654, Feb. 26, 1959, which is a division of application Ser. No. 658,982, May 14, 1957. This application June 28, 1961, Ser. No. 123,930
9 Claims. (Cl. 65—290)

This application is a continuation of our application Serial No. 795,654, filed February 26, 1959, now abandoned, and which, in turn, is a division of application Serial No. 658,982, filed May 14, 1957, now abandoned.

The present invention relates generally to the bending of glass sheets or plates, and more particularly to the bending of glass sheets to complex curvatures.

The tendency of automobile stylists and designers is to make increasingly greater use of glass as a part of the automobile body. Moreover, the styling changes are such as to incorporate more sweeping curvatures of both simple and complex formation as a part of the automobile body. When a particular curve in an automobile windshield, for example, begins with a radius of curvature of rather large magnitude and then has the radius of curvature decreased and, at the same time, has a bend or twist formed therein, it is readily visualized that the bending of a glass sheet or plate to conform to such a curvature is extremely difficult.

Therefore, an important object of the present invention is to provide apparatus for bending glass sheets to complex curvatures.

Another object of the invention is to provide apparatus for bending a glass sheet and twisting the sheet as it is being bent.

A further object of the invention is to provide an improved bending mold of the type having movable mold sections.

A still further object of the invention is to provide an improved mold for bending and twisting a sheet of glass which mold is provided with auxiliary supports to retain the sheet on the mold when in open position.

Other objects and advantages of the invention will become more apparent during the course of the following description when taken in connection with the accompanying drawings.

In the drawings, wherein like numerals are employed to designate like parts throughout the same:

FIG. 1 is a perspective view of a glass sheet bent in accordance with the apparatus of the invention;

FIG. 2 is a plan view of a multiple section bending mold constructed in accordance with the invention when in a closed position;

FIG. 3 is a side elevation of the mold shown in FIG. 2;

FIG. 4 is a fragmentary longitudinal section taken along the line 4—4 of FIG. 2;

FIG. 5 is a side elevation of the mold shown in FIG. 1 when in open position;

FIG. 6 is an end elevation of the mold shown in FIG. 2 as viewed from the right side thereof;

FIG. 7 is a perspective view of a two-piece glass product similar to that shown in FIG. 1;

FIG. 8 is a side elevation of a pair of molds used to produce the article shown in FIG. 7, with the left hand mold shown in closed position and the right hand mold shown in open position;

FIG. 9 is a plan view of the molds shown in FIG. 8;

FIG. 10 is an end elevation similar to FIG. 6 and showing the mold in the open position;

FIG. 11 is an end elevation of the mold shown to the right of FIG. 8;

Figure 12:
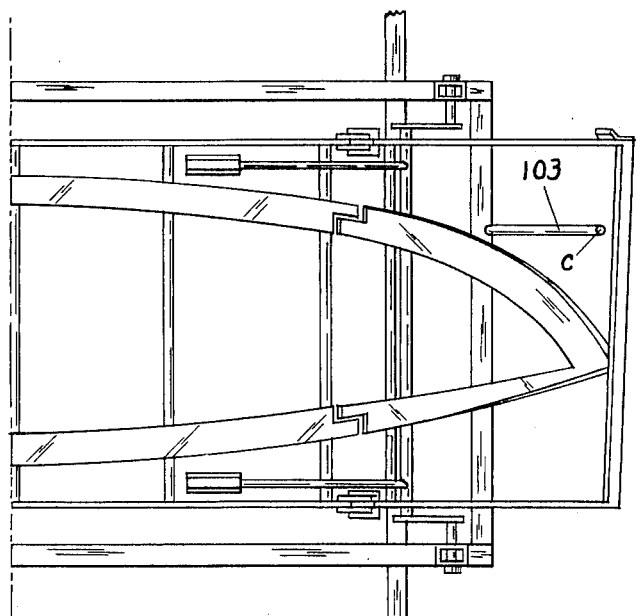
FIG. 12 is a fragmentary plan view of a modified form of the invention.

Briefly stated, the present invention provides an apparatus for bending a glass sheet to a complex curvature including end portions twisted relative to the central portion. As will be later described in detail, a glass sheet to be bent is mounted above the shaping surface of a mold constructed in accordance with the invention and which includes transversely disposed end shaping rails carried by movable mold end sections. According to the method of the invention, the opposite ends of the glass sheet to be bent are supported on the uppermost portions of the end rail sections and also on novel support means forming a part of the improved mold herein disclosed. After being softened by heat, the central portion of the glass sheet is bent or lowered toward the mold while the opposite sheet ends are progressively engaged by the angularly disposed end shaping rails while being lifted upwardly and are thus twisted relative to the central sheet portion and bent upwardly therefrom.

With reference to the drawings, and particularly to FIG. 1, the bent sheet 15 produced in accordance with the apparatus of the invention has a radius of curvature in its central portion A of comparatively large magnitude which curvature, on the lower side and at each end of the sheet, blends into a sharply decreased radius B. On the upper side of the sheet and at both ends thereof, the curvature of the central portion blends into a further decreased radius C. Since the radii B and C are of unequal magnitude, it is necessary to transversely twist the sheet end portions relative to the central portion during the bending operation which, of course, greatly complicates the bending of such a sheet.

Referring now to FIGS. 2 through 6 and 10, there is shown a bending apparatus 16 constructed in accordance with the invention and comprising a rack 17 and a sectionalized bending mold 18 supported above the rack. The rack 17 is formed by a pair of spaced parallel side bars 19 and 20 joined to one another at their opposite ends by end bars 21 and 22 to form a rigid frame. Extending upwardly from the rack side bars, adjacent each of the opposite ends thereof, are pairs of uprights 23 and 24 the uprights of each pair being transversely aligned with one another and supported on different side bars. As will be later described, these uprights serve to suspend the mold 18 above the rack 17. To guide the rack along the roll type conveyor used in most bending furnaces, a pair of spaced parallel guide rails 25 are fastened to the underside of the side bars 19 and 20.

The mold 18 comprises a central section 26 and two aligned and oppositely disposed end sections 27 connected to the center section for movement from an open position, as shown in FIG. 5, wherein a glass sheet 28, or a pair of sheets, is received, to a closed position, as shown in FIG. 3, wherein the glass sheet, or pair of sheets, is bent to the predetermined curvature of the mold shaping surface.

The central mold section 26 comprises a pair of spaced, substantially parallel shaping rails 29 and 30 having a long, sweeping radius of curvature and rigidly secured to one another by spaced cross bars 31.

Each of the mold end sections 27 includes a pair of spaced, parallel side shaping rails 32 and 33 of unequal curvature and length rigidly joined together at their outermost ends by a skewed end shaping rail 34 inclined downwardly from its point of junction with the rail 32 and disposed at an angle to the transverse axis x—x of the mold. Adjacent their innermost ends, the rails 32 and 33 are joined to one another by cross bar 35. A locator 36 is secured to the shaping rail 33 of each mold end section at its outermost extremity and has a portion 37 extending outwardly a limited distance and upwardly therefrom above the high end of the rail 34 to transversely position the glass sheet 28 with respect to the mold.

The upper surfaces of the various shaping rails, which contact the glass sheet, are carefully finished to the desired predetermined curvature to form end section shaping surfaces 38 and a center section shaping surface 39.

It is oftentimes desirable to provide a peripheral region of compression stress in the bent sheet having an outline similar to that of the pattern cut sheet that is cut from the blank size sheet 28. For this purpose, a contoured strain bar 40 is positioned on the mold within the confines of and slightly below th shaping surfaces 38 and 39 and comprises a center section 41, supported by the cross bars 31, and symmetrically matching end sections 42 supported by the respective cross bars 35 and cross rails 34.

When the sheet is passing through the annealing lehr, which is the case when the glass sheet 28 is not required to be tempered, the portion of the sheet above the bar 40 does not cool as rapidly as adjacent portions due to the residual heat in the bar and thus the adjacent portions are set in compression. After leaving the lehr, the sheet then may be cut along a portion slightly outwardly of the bar 40 wherein the sheet is in compression and thus the edge of the cut sheet is better able to withstand edge blows or pressure.

To join the mold sections 26 and 27 to one another, as is well known in the art, the inner ends of the end section side bars 32 and 33 are formed as yokes 43 having beveled ends to receive therein the adjacent ends of the center section rails 29 and 30 which are provided with members 44 to match and abut the yokes 43. Axially aligned holes are provided in the yoke 43 and member 44 through which a pin 45 may be inserted and thus complete the hinged joints which are designated by the numeral 46.

To support the mold for movement from the open position of FIG. 5 to the closed position of FIG. 3, each of the mold end sections 27 is provided with a pair of aligned depending struts 47 and 48, one of which (47) is secured to the side rail 32, and the other (48) being secured to the side rail 33. Axially aligned holes are provided at the ends of the members 47 and 48 to fixedly receive therethrough a transversely disposed horizontal rod 49 which has its opposite ends projecting outwardly beyond the side rails 32 and 33. Each of the opposite ends of the rod 49 is rotatably received in the lower end of a link 50 pivotally supported at its uppermost end upon a short rod 51 extending inwardly from the respective uprights 23 and 24.

As shown in FIGS. 5 and 10, when the mold is in the open position, the end rail section 34 is inclined at an angle to the horizontal and thus is not available to support the end of the glass sheet which preferably is supported substantially horizontally when cold so that as the sheet is heated the force of gravity acts normal to the plane of the sheet.

In accordance with the invention, there is provided a pair of metallic sheet supports or outriggers 52 positioned inwardly of the rail 34, when the mold is in the open position, and supported on rods 53 extending at an angle upwardly and outwardly from the rack end bars 21 and 22 at each end of the mold. The upper or sheet engaging portion $a$ of the outriggers 52, when the mold is in the open position, is in the same plane as the upper end of the rail 34 at the junction point thereof with the side rail 32 and has a series of spaced serrations $b$ formed therein so that the surface $a$ engages the glass sheet at a plurality of relatively closely spaced points which prevents the formation of "chill cracks" in the glass sheet. Thus as shown in FIG. 10, each end of the glass sheet 28 prior to bending is supported for a very limited distance adjacent and slightly inwardly of one corner thereof by the rail 34, and for a considerably greater distance is linearly supported by the outrigger 52 inwardly of the opposite sheet corner. As will be later described, this manner of supporting the ends of the glass sheet to be bent affords progressive gradual engagement of the sheet by the rails 34 during the closing action of the mold.

It is oftentimes desirable to support the glass sheet intermediate the ends thereof and thus prevent sheet deflection which, depending upon the sheet length, could unduly accelerate the bending thereof. For this purpose, a plurality of supports 54 including refractory or ceramic sheet support blocks 55 are provided, which blocks engage the undersurface of the sheet at approximately the ⅓ points thereof. As shown in FIG. 5, the upper surface of each of the blocks 55 is disposed in substantially the same plane as the junction point of the rails 32 and 34 and also in the plane defined by the sheet engaging surface $a$ of the outriggers 52.

Each of the blocks 55 is mounted in a holder 56 which is pivotally secured to one end of a lever arm 57 in such a manner as to provide limited motion of the block for self-alignment with the lower surface of the glass. The other end of the lever arm 57 is welded or otherwise rigidly secured to the cross rod 49. As will be later described, the blocks 55 are moved into sheet supporting position when the mold is opened, as viewed in FIG. 5, and will continuously engage the undersurface of the glass sheet as the mold begins to close, coming to rest below the shaping surface 38 when the mold is in its closed position shown in FIG. 3.

*Operation*

In bending a glass sheet according to the method of the invention, and by the apparatus herein disclosed, the mold is moved to the open position of FIG. 5 by rotating the end mold sections 27 about their respective cross rods 49, the links 50 swinging about the pins 51 to accommodate the increase in mold length. A sheet, or sheets, of glass 28 are then placed on the mold and positioned with a longitudinal edge against the locators 37. As thus positioned, the sheet is supported in a substantially horizontal plane by the high end of the rail 34, by the sheet engaging surface $a$ of the outriggers 52, and by the support blocks 55. Due to the rigid character of the glass sheet in its cold condition, the weight thereof acting upon the rails 34 retains the mold in the open position. The mold having the glass sheet thus supported thereon is then passed into a bending furnace maintained at temperatures sufficient to soften the sheet. As the sheet begins to soften, its rigidity is decreased and, under the influence of heat and gravity, the sheet tends to sag downwardly toward the shaping surface of the mold. At this time, the outer ends of the end mold sections 27 begin to initially swing upwardly and inwardly about the rotating rods 49 which move inwardly upon the links 50 thus carrying the end edge portions of the sheet indicated by the letter *d* in FIG. 1 therewith, the sheet portions *e* remaining on the outriggers 52.

Simultaneously with the movement of the mold end sections, the support blocks 54 move downwardly in contact with the glass sheet due to their connection with the inwardly rotating support rods 49.

As the mold end sections continue to move upwardly, the substantially point contact of the high end of the rail 34 with the glass sheet is gradually increased to lineal contact across substantially the entire width of the glass sheet. More specifically, as the upper end of the rail 34 moves upwardly and inwardly, the glass sheet which is initially flat is progressively engaged by the rail 34 and lifted upwardly thereby, the progressive engagement starting immediately inwardly of the junction point of the rails 32 and 34 and moving along the end of the glass sheet toward the longitudinal edge thereof in contact with the locator 37. Since the rail 34 is inclined at an angle to the horizontal, the edge corner of the glass sheet adjacent the junction point of rails 32 and 34 is maintained at a higher elevation during the initial closing action of the mold than is the edge corner of the sheet adjacent the junction point of the rails 33 and 34. At the same time, the lowered central portion of the sheet defined by the area thereof inwardly of the blocks 55 is maintained substantially flat or horizontal due to the supporting action of these blocks. Thus, during the closing movement of the mold end sections, a progressively increasing twist is formed in both ends of the glass sheet outwardly of the blocks 55 due to the rails 34 progressively engaging the glass sheet at an angle to the horizontal or plane of sheet support.

During the further closing of the mold, the portion of the glass sheet resting upon the outrigger 52 is progressively lifted therefrom by the adjacent section of the rail extending between the points *g* and *h* (FIG. 2). Prior to engagement by this section of the rail 34, the corresponding portion of the glass sheet has been maintained substantially flat by the outrigger and any tendency of the glass to move toward the low end of the rail 34 is prevented by the locator 37 as well as by frictional contact of the glass with the outrigger 52. Thus, the progressive contact of the rail 34 with the end of the glass sheet is assured.

Immediately prior to the final closing movement of the mold sections and at approximately the same time as the low end of the rail 34 makes contact with the glass sheet, the sheet engaging surfaces of the blocks 55 are in substantially the same plane or slightly above the adjacent portions of the center mold section rails 29 and 30, and the final increment of mold movement withdraws the blocks 55 below the rails to the position shown in FIG. 3. The proper timing of the movement of these blocks is important since it is desirable that the glass sheet settle into conformity with all portions of the mold shaping surface at substantially the same time.

It will be readily understood that as the blocks 52 are lowering the sheet toward the mold center section, the sheet portions outwardly thereof are moving downwardly toward the upwardly rising rail sections 32 and 33. In this connection, it will be noted that in the open mold position of FIG. 5, the outer end of the rail 32 is at a higher elevation than the outer end of the rail 33. However, the lengths of these respective rail sections are proportioned so that although the sheet portion in contact with the high end of the rail 34 is first lifted, the arc through which the rail 34 travels is calculated to bring the rail 33 in contact with the glass sheet substantially simultaneously with contact of the sheet by the rail 32 thus minimizing any tendency of the sheet to slide when contacted by these rails.

After the twisted sheet has conformed to the mold shaping surface, the mold is passed through an annealing lehr wherein the temperature of the sheet is slowly reduced to approximately room temperature. While passing through the lehr, the portions of the glass sheet above the strain bar 40 and the shaping surface 36 of the mold are maintained at a higher temperature than the portions of the sheet between the shaping rail and the strain bar due to the residual heat within the strain bar and shaping rail which cool at a slower rate than does the glass sheet. This causes the sheet portions above the strain bar and shaping rails to cool with tension stresses therein while the sheet portion therebetween is set in compression.

After being cooled, the glass sheet is removed from the mold and trimmed to pattern size through the area thereof which was located slightly outwardly of the bar 40.

*Modification*

The glass product shown in FIG. 7 is substantially the same as that shown in FIG. 1 with the exception that it is split transversely on the center line into two mating parts, generally indicated by the numerals 58 and 59.

The mold for producing these parts is shown in FIG. 8, with the right hand mold section 60 in open position and the left hand mold section 61 in closed position. Both molds are mounted on a rack 62 which only differs in construction from that of the rack 17 in that the side bars 63 and 64 have been lengthened. The side bars are joined at their ends by end bars 65 and 66.

To support the molds 60 and 61, four uprights are secured to the opposite ends of the side bars 63 and 64 with one aligned pair of uprights 67 located at one end of the rack and a matching pair of aligned uprights 68 positioned at the opposite rack end. Four shorter uprights rise from the side bars in aligned pairs 69 and 70 spaced inwardly from their respective mating uprights 67 and 68 and are in parallel, spaced relationship with each other and with the uprights 67 and 68. A pair of rails 71 are secured to the undersurface of the side bars 63 and 64 for the purpose of supporting the rack upon a roller conveyor used in most bending furnaces.

The molds 60 and 61 are identically constructed with the exception that 60 is right hand and 61 left hand, the two being equally spaced from the center line which bisects the side bars 63 and 64. Hereinafter, like numerals will designate like parts in molds 60 and 61.

The mold, either 60 or 61, comprises a lower movable section 72 of relatively shallow curvature and an upper movable section 73 movably connected to one another by hinged joints 74, identical to the hinged joints 46, for movement from an open position as indicated by the mold 60 to a closed position as shown by the mold 61.

The lower mold section 72 comprises a pair of shaping rails 75 and 76 held in spaced parallel relation intermediate their ends by cross bars 77 and at their lowermost ends by an end rail 78 having a pair of spaced stops 79 secured thereto to position the lowermost end of a glass sheet 80 when mounted on the mold. To laterally locate the glass sheet, a stop 81 is secured to the rail 76.

The upper or end section 73 of the mold is similar to the mold end section 18 and includes a pair of spaced parallel shaping rails 82 and 83 of unequal curvature and length rigidly joined together at their outermost ends by a downwardly inclined skewed end rail 84, and at their innermost ends by a cross bar 85. To laterally position the glass sheet 80 on the upper mold section, a locator 86 is secured to the outside surface of the shaping rail 83 adjacent its point of junction with the rail 84.

As shown by the mold 61 to the left of FIGS. 8 and 9, when in the closed mold position the shaping rails 75, 76, 78, 82, 83 and 84 combine to form, on their upper surfaces a substantially continuous shaping surface designated by the numeral 87. Within the confines of the shaping surface and spaced downwardly therefrom is a strain bar 88 comprising component parts 89 and 90 supported by the respective mold sections 72 and 73.

As previously mentioned, the mold sections 72 and 73 are movably connected to one another by the hinged joints 74 for movement from an open to a closed position. To support the mold sections for such movement, the lower mold section 72 is provided with a transverse rod 91 rigidly secured to the undersurface of the rails 75 and 76. The opposite ends of the rod 91 extend outwardly beyond the rails 75 and 76 and each end is rotatably received in the lower end of a link 92 having its upper end rotatably supported upon a pin 93 projecting inwardly from each of the relatively short uprights 70. The upper mold section 73 is similarly supported by means of a transverse rod 94 rigidly secured to the mold section by means of struts 95 depending from the rails 82 and 83. The opposite ends of the rod 94 extend beyond the rails 82 and 83 and are each rotatably received in a link 96 having its upper end rotatably supported upon a pin 97 extending inwardly from the uprights 68.

Similarly to the end rail 34 of the mold section 18, the end rail 84 of the upper mold section 73, in the open mold position, is inclined at an angle to the horizontal and slopes downwardly and outwardly toward the end thereof adjacent the locator 86 so that only the high end of the rail 34 engages the sheet prior to bending the same. To support the portion of the sheet not engaged by the high end of the rail 34, an outrigger device 98 substantially identified to the outrigger 52 is provided and comprises a plurality of rods 99 extending upwardly from the end rail of the rack 62 having supported on their uppermost ends a plate 100 having a flat sheet engaging surface $b$ formed thereon which serves the same function as the sheet engaging surface $a$ of the outrigger 52.

For the purpose of supporting the glass sheet 80 intermediate the ends thereof when mounted upon the mold, spaced uplift devices are provided which comprise a pair of base members 101 rigidily secured at the lowermost ends thereof to the transverse rotatable rod 94 and having mounted at their opposite ends a sheet engaging member in the form of a block 102 which operates in the same manner as do the blocks 55.

As shown in FIG. 8, when the mold is in the open position, the upper edge of the rail 78, the upper surface of the blocks 102, the high end of the rail 84, and the sheet engaging surface $a$ of the plate 100 lie in a common plane which is at a downwardly inclined angle with respect to the horizontal and all of the aforementioned members serve to support the glass sheet in bending relation to the mold as the sheet and mold are passed through a bending furnace. Upon passing through the furnace and the surface of the sheet, the mold end section 73 rotates upwardly and concurrently therewith the blocks 102 lower the glass sheet 80 toward the mold shaping surface, and during the final increment of mold movement are lowered beneath the mold shaping surface as is shown in the mold disposed to the left in FIG. 8.

Figure 13:
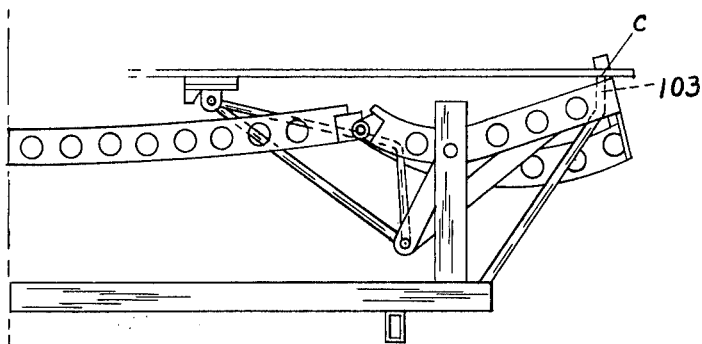
FIG. 13 is a fragmentary side elevation of the modified form of the invention.

A modified form of outrigger device is shown in FIGS. 12 and 13 and may be used with either the mold utilized in bending a full sized glass sheet, or with the mold used in forming a half size glass sheet. The outrigger 103 comprises a single rod like member having its lowermost end joined to the rack end rail and its uppermost end $c$ located at the same elevation as the sheet engaging surfaces of the outriggers 52 and 98 and rounded to provide a curved sheet engaging surface. As compared to the outriggers 52 and 98, the outrigger 103 affords only substantially point engagement of the glass sheet and for this reason is not normally used if the sheet is heated to a relatively higher than normal temperature during bending.

It is to be understood that the forms of the invention herewith shown and described are to be taken as the preferred embodiments of the same, and various changes may be resorted to without departing from the spirit of the invention or the scope of the subjoined claims.

We claim:
1. In a bending apparatus, a sectionalized bending mold comprising a plurality of mold sections having shaping surfaces thereon and including a movable mold section, means mounting said movable mold section for movement between an open position in which to receive a flat glass sheet to be bent and a closed position in which said shaping surfaces define the curvature to which the flat glass sheet is to be bent, a stationary outrigger, and means mounting said outrigger outwardly of the confines of said mold when the mold is in closed position but in position to engage a flat glass sheet that has been received on said mold within the confines of said mold sections when said mold is in open position.

2. In a bending apparatus for bending glass sheets, the combination of a rack, a sectionalized bending mold supported above said rack, said bending mold comprising a plurality of mold sections each having a shaping surface thereon and including a movable mold section having an end shaping rail, and means mounting said movable mold section for movement from an open position, in which a flat glass sheet is received on the mold, to a closed position wherein the shaping surfaces on the mold sections form substantially continuations of one another and receive a glass sheet bent into conformity therewith, said movable mold section shaping rail being inclined at an angle to the horizontal to provide a high end engaging the undersurface of a flat glass sheet adjacent one corner at one end thereof when the mold is in an open position and the flat glass sheet is received on the mold, a stationary outrigger, the upper surface of said outrigger, when the mold is in an open position, engaging the undersurface of a flat glass sheet adjacent the other corner at the same end thereof when the glass sheet is received on the mold, and means for mounting said outrigger to said rack so that the outrigger is inside the confines of the shaping rail of the movable mold section when the mold is in an open position and outside the confines of the shaping rail of the movable mold section when the mold has moved to its closed position, the upper surface of said outrigger being disengaged from the glass sheet when the movable mold section is in its closed position.

3. In a bending apparatus for bending glass sheets as claimed in claim 2, wherein said movable mold section shaping rail is disposed at an angle to the longitudinal axis of the mold.

4. In a bending apparatus for bending glass sheets as claimed in claim 2, including a sheet locator secured to one end of the inclined movable mold section shaping rail, said locator including a portion extending outwardly and upwardly from said rail.

5. In a bending apparatus for bending glass sheets as claimed in claim 2, wherein the upper surface of the outrigger is serrated so that said outrigger upper surface engages the glass at a plurality of closely spaced points.

6. In a bending apparatus for bending glass sheets as claimed in claim 2, wherein said mold includes a pair of movable end sections, a movable center section, a plurality of stationary outriggers, and means for mounting one of said outriggers to said rack within the confines of the shaping rails of each movable end section when the mold is in an open position and outside the confines of said movable mold shaping rails after the mold has moved to a closed position.

7. In a bending apparatus for bending glass sheets as claimed in claim 2, a plurality of support blocks, means for mounting the support blocks within the confines of the mold shaping surface so that the upper surface of each block is disposed in substantially the same plane as the plane defined by the upper surface of said outriggers and the high end of said inclined shaping rail when the mold is in its open position, said mounting means retracting the support blocks downwardly out of contact from the glass sheets and below the mold shaping surface when the mold moves to its closed position.

8. In a bending apparatus for bending glass sheets as claimed in claim 2, wherein said movable mold section includes a pair of side shaping rails of unequal curvature and length, each of said side rails being rigidly joined to an end of the inclined movable mold section shaping rail, the junction point of the high end of said inclined rail and the side shaping rail joined thereto forming a point support for one end corner of a glass sheet resting thereon when the mold is in its open position.

9. In a bending apparatus for bending glass sheets as claimed in claim 2, wherein said outrigger is composed of a single rod member having an upper surface which contacts the flat glass sheet at substantially a single point.

References Cited by the Examiner

UNITED STATES PATENTS

| | | | |
|---|---|---|---|
| 2,551,606 | 5/1951 | Jendrisak | 65—107 |
| 2,695,476 | 11/1954 | Jendrisak | 65—290 |
| 2,736,140 | 2/1956 | Black | 65—291 |
| 2,859,561 | 11/1958 | Jendrisak | 65—290 |
| 2,861,395 | 11/1958 | Richardson | 65—290 |
| 2,872,756 | 2/1959 | Jendrisak | 65—290 |
| 2,876,595 | 3/1959 | Golightly | 65—288 |
| 2,924,045 | 2/1960 | Startzell | 65—288 |

FOREIGN PATENTS 536,876  12/1955  Italy.

DONALL H. SYLVESTER, *Primary Examiner.*